Reissued Jan. 14, 1947 Re. 22,830

UNITED STATES PATENT OFFICE 22,830

COMPOUNDED OIL

John T. Rutherford and Robert J. Miller, Berkeley, Calif., assignors, by mesne assignments, to California Research Corporation, San Francisco, Calif., a corporation of Delaware No Drawing. Original No. 2,252,985, dated August 19, 1941, Serial No. 272,155, May 6, 1939. Application for reissue June 14, 1945, Serial No. 599,530

19 Claims. (Cl. 252—32.7)

This invention relates to a new and useful composition of matter and involves a composition comprising a hydrocarbon, such as a viscous hydrocarbon oil, and an alkaline earth metal salt of sulfur-containing substituted acids of phosphorus.

The production of improved hydrocarbon oils, and particularly of lubricating oils having desired characteristics, has been the subject of extensive research and investigation in recent years. Generally speaking, the compounding of hydrocarbon oils to obtain desired characteristics involves empirical phenomena and the action of untested types of compounding agents cannot be predicted.

A characteristic which has been the subject of extensive investigation is the tendency of hydrocarbon oils to deteriorate or partially decompose and oxidize when subjected to high temperatures. This deterioration is evidenced by the deposition of adhesive deposite on hot metal surfaces over which the hydrocarbon oil may flow. It is important that resistance to such deterioration be imparted to hydrocarbon oils, particularly to lubricating oils, in order that such compositions may be relatively free from the tendency to form such deposits even under high temperatures and severe operating conditions. A direct result of this type of deterioration during lubrication of internal combustion engines, such as engines of the Diesel type, is the tendency of the oil to cause or permit the sticking of piston rings.

The crankcase lubricant in internal combustion engines is subjected to extremely severe operating conditions and in engines of the Diesel type the lubricant encounters in the piston ring zone temperatures of from approximately 425 to 650° F. and pressures from the oxidizing combustion gases as high as 750 to 1150 lbs. per sq. in. Addition agents which render hydrocarbon oils resistant to deterioration by heat at high temperature levels in the order of those above mentioned usually impart to the oil the ability to inhibit piston ring sticking in internal combustion engines and permit longer periods of operation of such engines without the necessity of major overhauls heretofore occasioned by stuck piston rings.

It should be noted that stabilizing agents which are effective at low temperatures to impart increased stability to hydrocarbon oils, or which are effective at temperatures even as high as 200 or 250° F., are often ineffective under the more severe operating conditions and higher temperature levels to which lubricating oils are subjected in Diesel engines. Thus the operativeness of a stabilizer at atmospheric temperatures, or even temperatures as high as 200 to 300° F., gives no adequate basis for predicting the action of the same stabilizing agent at materially higher temperatures and under more severe operating conditions. The disclosures in the prior art relative to such stabilizers therefore cannot serve as a guide for one seeking stabilizing agents or oxidation inhibitors effective at higher temperature levels. The phenomena involved are catalytic in nature, are highly empirical, and require extensive experimentation to determine the action of a given type of addition agent.

The present invention involves the discovery that dispersion of high molecular weight alkaline earth metal salts of sulfur-containing substituted acids of phosphorus in hydrocarbon oils, such as mineral lubricating oil, imparts new, unpredictable and highly desirable properties to the composition. These new properties render the compounded oil particularly useful for various purposes. Although increased resistance to deterioration at high temperature levels comprises one of the principal advantages of the compounded oil of this invention, it is to be understood that the invention is not limited to this feature and that different compounds of the general type involved herein vary in their degree of effectiveness. In general, however, it has been discovered that the new compositions herein disclosed are more stable to heat than is a hydrocarbon oil with which the compositions are compounded. The new compositions of this invention are therefore useful where resistance to deterioration by heat is important. An example of such utility other than as a lubricating oil comprises use as a heat transfer fluid where it may be desirable to inhibit or prevent the formation of a deposit on the metal surfaces from or to which heat is being conveyed. Likewise, the increased resistance to oxidation imparted to the oil by the compounds of this invention will find various applications as, for instance, in insulating, switch or transformer oils.

It has also been discovered that calcium salts of sulfur-containing substituted phosphoric acids, in particular, have a combination of properties heretofore unknown and particularly desirable in compounded lubricating oils, namely, the ability to inhibit oxidation and impart to lubricating oils increased resistance to deterioration by heat, the ability to inhibit piston ring sticking, freedom from the production of increased wear on cylinder walls and piston rings as compared with uncompounded mineral oils, not only low corrosivity as respects the chemical action of the compounded oil on bearing metals, such as cadmium-silver and copper-lead alloys, but the capacity to actually inhibit the corrosive action of highly paraffinic oils on these bearing metals, and the capacity to inhibit piston ring sticking and ring slot carbon formation in paraffinic lubricating oils of the Pennsylvania type. Although various compounding agents are known which are capable of inhibiting piston ring sticking, the discovery of specific agents capable of imparting the above combination of properties to hydrocarbon oils represents an unobvious and important contribution.

Alkaline earth metal salts of sulfur-containing substituted acids of phosphorus which may be added to hydrocarbon lubricating oils to provide a new composition of matter of the type herein involved comprise compounds which may be represented by the general formula:

$$M_a((RX)_bH_cPY_d)_e$$

where M is an alkaline earth metal selected from group II of Mendeleeff's Periodic Table of the Elements. Examples of such metals are calcium, strontium and barium. For the purposes of this invention, in its broader aspects, magnesium may also be classified as an alkaline earth metal. In the above formula R may be a high molecular weight alkyl, aryl, alkaryl, aralkyl, or cyclic non-benzenoid groups; X and Y each are either sulfur or oxygen and sulfur; H is hydrogen; P is phosphorus; *a*, *b*, *d* and *e* represent small whole numbers, and *c* may be zero or a small whole number.

The salts of this invention are preferably formed from substituted acids of pentavalent phosphorus of one or more of the following type formulae:

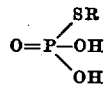
monothioester of phosphoric acid

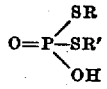
di-thio ester of phosphoric acid

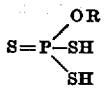
mono-ester of tetra-thiophosphoric acid

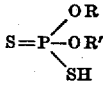
di-ester of tetra-thiophosphoric acid

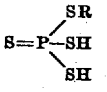
monothioester of tetra-thiophosphoric acid

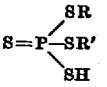
di-thio ester of tetra-thiophosphoric acid

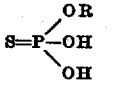
mono-ester of mono-thiophosphoric acid

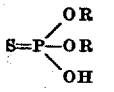
di-ester of mono-thiophosphoric acid where R and R′ are high molecular weight alkyl, aryl, alkaryl, aralkyl, or cyclic non-benzenoid groups. Thus R and R′ may be any of the following groups: cetyl, cetylphenyl, lauryl, octadecyl, spermol, oleyl, spermenyl, amylphenyl, tetra-chloro-octadecyl and 6-chloro, 2-phenyl phenyl. Examples of preferred type acids are high molecular weight alkyl or alkaryl sulfur-containing substituted phosphoric acids. However, it is to be understood that the broader aspects of the invention include other types of sulfur-containing substituted acids of phosphorus containing high molecular weight organic radicals. Additional examples of such acids which may be used in forming the alkaline earth metal salts of the present invention are as follows:

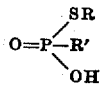
mono-thioester of phosphonic acid

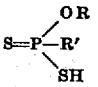
mono-ester of trithiophosphonic acid

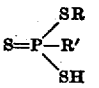
mono-thioester of trithiophosphonic acid.

In all of the above formulae R and R′ may be alkyl, aryl, alkaryl, aralkyl, or cyclic non-benzenoid groups.

In general, alkaline earth metal salts of sulfur-containing substituted derivatives of acids of phosphorus, such as phosphorous acid, $H_3PO_3$; hypophosphoric acid, $H_2PO_3$; orthophosphoric acid $H_3PO_4$; pyrophosphoric acid, $H_4P_2O_7$; monothiophosphoric acid, $H_3PSO_3$; dithiophosphoric acid, $H_3PS_2O_2$; trithiophosphoric acid, $H_3PS_3O$; tetra-thiophosphoric acid, $H_3PS_4$; thiopyrophosphoric acid, $H_4P_2S_7$; and trithiopyrophosphoric acid, $H_4P_2S_3O_4$, fall within the broadest aspects of the invention. By "substituted acids" or "substituted derivatives" of phosphorus, whenever used herein, it is intended to designate acids of phosphorus containing an organic group of the type previously listed. The organic group may be either directly attached to the phosphorus atom of the compound or attached thereto through an intervening atom such as oxygen or sulfur. The term "sulfur-containing" is intended to designate compounds in which either the original acid of phosphorus or the organic derivative thereof contains sulfur.

The preferred acids are sulfur-containing substituted acids of pentavalent phosphorus and the preferred salts comprise calcium salts of such acids. Examples of preferred salts are calcium cetyl thiophosphate, calcium cetyl phenyl thiophosphate, and a calcium salt of the acid phosphoric acid ester of di-(p-hydroxy phenyl) sulfide. Salts such as calcium thiocresyl phosphate are less effective than the previously recited compounds but improve various properties of the oil, particularly its resistance to oxidation.

Additional examples of salts within the scope of the invention are calcium lauryl thiophosphate, calcium octadecyl thiophosphate, calcium spermol thiophosphate, calcium oleyl thiophosphate, calcium spermenyl thiophosphate, calcium di-(amyl phenyl) thiophosphate, calcium naphthenyl thiophosphate, calcium di-cyclohexanyl thiophosphate, calcium tetra-chloro-octadecyl thiophosphate, calcium di-(6-chloro, 2-phenyl phenyl) thiophosphate, calcium di-(3-methyl, 4-chloro-phenyl) thiophosphate, barium lauryl thiophosphate, barium octadecyl thiophosphate, barium spermol thiophosphate, barium oleyl thiophosphate, barium spermenyl thiophosphate, barium di-(amyl phenyl) thiophosphate, barium naphthenyl thiophosphate, barium di-cyclohexanyl thiophosphate, barium tetra-chloro-octadecyl thiophosphate, barium di-(6-chloro, 2-phenyl phenyl) thiophosphate, and barium di-(3-methyl, 4-chloro-phenyl) thiophosphate.

The sulfur-containing substituted acids of phosphorus utilized for preparing the alkaline earth salts of this invention may contain organic substituents other than pure hydrocarbon groups. The organic radical in the acid of phosphorus may comprise, in addition to the carbon and hydrogen, substituents such as the halogens, chlorine or bromine, hydroxy, sulfhydryl and similar groups. Likewise, the sulfur in the sulfur-containing atom need not necessarily be directly attached to the phosphorus atom. An acid which illustrates these types of compounds comprises the phosphoric acid ester of di-(p-hydroxy phenyl) sulfide.

The acids of phosphorus utilized in the present composition may be prepared by various methods. For example, a mixture of a higher alcohol and phosphorus pentasulfide, a mercaptan and phosphorus pentoxide, a mercaptan and phosphorus pentasulfide or a three-component mixture, such as a mercaptan, phosphorus pentoxide and pyrophosphoric acid, may be directly fused in proportions to give acid esters. The reaction by which the substituted phosphoric acid is formed in the last mentioned three-component mixture is believed to be represented by the following equations:

$$2RSH+P_2O_5 \rightarrow H_2RSPO_3+RSPO_2$$
$$2RSH+RSPO_2+H_4P_2O_7 \rightarrow 3H_2RSPO_3$$

For example, thio-cresyl phosphoric acid may be prepared by reacting thiocresol with phosphorus pentoxide and pyrophosporic acid at a temperature not in excess of 250° F. The thiocresol is charged to a stainless steel mixer equipped with a jacket. Steam is admitted in the jacket until a temperature of 200° F. is reached, at which temperature the phosphorus pentoxide and pyrophosphoric acid are added. Water is circulated through the jacket at this time to control the reaction temperature. Stirring is continued until the reaction is complete and the product withdrawn.

In preparing the metal salts involved herein the alkali metal salt of the above acid may be dissolved in aqueous solution and the alkaline earth metal salt precipitated therefrom. For instance, the calcium salt may be manufactured by precipitation as follows: Water and caustic potash are charged to a mixer and heated to a temperature of 180° F. The acid is added, thereby forming an alkali salt. An aqueous calcium chloride solution is incorporated with violent agitation during precipitation to prevent inclusion of the potassium salt. The precipitated curd is washed free of inorganic salts with hot fresh water. Mineral oil is then added and the solution is dehydrated as by heating to a temperature of 300–330° F. The concentrated oil solution so obtained may conveniently be used for mixing or blending with other oils to prepare the completed product.

The alkaline earth salts may also be prepared in the non-aqueous environment by the reaction of a metal carbide with the free substituted acid. For example, calcium carbide may be reacted with free cetyl thiophosphoric acid to yield acetylene and anhydrous calcium cetyl thiophosphate.

By way of illustration and to demonstrate the unusual properties possessed by the compounded oils of this invention, test data are given in Table I:

*Table I*

| Compound | Method of manufacture of acid | Per cent salt | Oxidator test: cc. oxygen absorbed in 2.5 hours | Hours to stick piston rings |
|---|---|---|---|---|
| COMPOUNDED IN ACID REFINED WESTERN OIL S. A. E. 30 | | | | |
| Mineral oil | | 0 | 324 | ---------- |
| Calcium phosphate of p-hydroxydiphenylsulfide. | p-Hydroxydiphenylsulfide and $P_2O_5$+phospholeum. | 1 | 76 | ---------- |
| Calcium thiocresylphosphate | Thiocresol and $P_2O_5$+phospholeum | 1 | 50 | ---------- |
| Calcium cetylthiophosphate | Cetyl alcohol+$P_2S_5$ | 1 | 48 | ---------- |
| Do | do | .05 | 18 | ---------- |
| Calcium cetylphenylthiophosphate | Cetyl phenol+$P_2S_5$ | 1 | 170 | ---------- |
| Calcium thiocresylthiophosphate | Thiocresol+$P_2S_5$ | 1 | 76 | ---------- |
| COMPOUNDED IN PENNSYLVANIA OIL S. A. E. 30 | | | | |
| Mineral oil | | 0 | 302 | 45 |
| Calcium cetylphenylthiophosphate | Cetylphenol+$P_2S_5$ | 1 | 180 | ---------- |
| Do | do | .5 | ---------- | 165+ |
| Calcium cetylphenylthiophosphate+calcium cetylphenate. | do | .5+.25 | ---------- | 120 |
| Calcium thiocresylthiophosphate | Thiocresol+$P_2S_5$ | 1 | 188 | ---------- |

It will be observed that all of the compounding agents were effective to very substantially inhibit the absorption of oxygen in, and deterioration of, the mineral lubricating oil in the oxidator test. This test is described by Dornte in the Journal of Industrial and Engineering Chemistry, 1936, vol. 28, page 26, and was carried out in the present examples at 340° F., which represents very severe conditions.

In the piston ring sticking tests a single cylinder, 2⅝″ bore, 2½″ stroke, Lauson gasoline engine was operated under extremely severe conditions for the purpose of developing fully piston ring sticking and piston gumming tendencies under circumstances simulating severe operating conditions encountered in the field. Operation of the motor during test was continuous at 1600 R. P. M. except for periodic shut-downs at fifteen-hour intervals for inspection. The jacket temperature was maintained at approximately 375° F. and the sump oil temperature at approximately 220° F. during the test.

In the table above and elsewhere hereinabove, reference is made to a mode of preparing lubricant additives of this invention, wherein an alcohol or a phenol is reacted with phosphorus pentasulfide to produce a sulfur-containing acid of phosphorus. Salts of these acids are formed to be used as lubricant additives. It is known that the reaction of an alcohol or phenol with phosphorus pentasulfide proceeds in this manner:

$$2R\cdot OH+P_2S_5\rightarrow R_2PO_2S_2H+H_2S$$

wherein ROH is an alcohol or a phenol. There is some uncertainty as to the exact structure of the resulting ester of thiophosphoric acid but, by the great weight of authority, the said ester is believed to have the structure

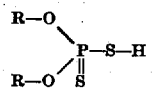

In any event, it is certain that when an alcohol or a phenol is reacted with $P_2S_5$ to give an acid ester, the product is predominantly a di-ester (i. e., containing two alcoholic or phenolic radicals) containing two sulfur atoms in the molecule. See, for example, Pishchimuka, J. Chem. Ukraine, vol. 1, p. 87 (Chem. Abstracts, vol. 20, p. 2816, (1926)), and J. Russian Physical Chemical Society, vol. 44, 1406 (C. A., vol. 7, 987 (1913)) and vol. 56, p. 11 (C. A., vol. 19, 2808 (1925)); Wagner-Jauregg et al., Berichte d. deut. Chem. Ges., vol. 74B, p. 1513 (1941); and United States Patents Nos. 1,748,619 (Romieux and Wohnsiedler), 1,889,943 (Barsky and Heuser), 1,893,018 (Christmann) and 2,063,629 (Salzberg and Werntz).

Thus the calcium, chromium and lead cetylthiophosphates (Ca, Cr and Pb salts of acid ester of $P_2S_5$ and cetyl alcohol) and the calcium cetylphenylthiophosphate (Ca salt of acid ester of $P_2S_5$ and cetylphenol) of Table I are calcium, chromium and lead dicetyl dithiophosphates and calcium dicetylphenyl dithiophosphate, respectively.

The compounding agents of this invention are outstanding in that they are more effective to inhibit piston ring sticking in Pennsylvania type oils than are any compounds heretofore found. As has been pointed out hereinbefore, the compounding agents are also effective to inhibit the corrosive action of paraffinic oils on bearing metals, such as copper-lead or cadmium-silver alloys. Corrosion data, together with data on the increase in viscosity of the oil and A. S. T. M. insolubles, are given in Table II:

*Table II*

| | Mineral oil Penn. S. A. E. 30 | Calcium cetylphenylthiophosphate | Calcium cetylphenylthiophosphate+calcium cetylphenate |
|---|---|---|---|
| Per cent salt | 0 | 1 | .5+.25 |
| Strip corrosion test: | | | |
| Mg. loss 72 hr.— | | | |
| Cu-Pb | 19.4 | +1 | 5.9 |
| Cd-Ag | 0.1 | 0.1 | 0.5 |
| Per cent increase in vis. at 100° F | 16 | 9 | 10 |
| Ins. in A. S. T. M. naphtha, mg | 12 | 0 | 5 |

The above corrosion tests were carried out in the following manner: Glass tubes 2 inches in diameter and 20 inches long were immersed in an oil bath, the temperature of which was automatically controlled to within ±1° F. of the test temperature, which was 300° F. Approximately 300 c. c. of oil under the test was placed in each tube and air was bubbled through it at the rate of 10 liters per hour. Strips of the different types of bearing metals were cut to size and placed in the oils; in most cases the copper-lead and cadmium-silver bearing alloys were tested simultaneously in the same sample of oil. The weight loss of each strip was recorded. Before weighing, each strip was washed in petroleum ether and carefully wiped with a soft cotton cloth. The duration of the test was 72 hours.

The compounding agents herein disclosed may have one or more advantages, depending upon the particular compound selected, the proportion utilized, and the environment which the lubricating oil is to encounter. It should be observed, for example, that even though a compounded oil may be somewhat corrosive to copper-lead or cadmium-silver bearing metals, Babbitt bearings are little, if at all, affected by such corrosive action. Hence, compounded oils which may not be particularly desirable for lubrication of copper-lead or cadmium-silver bearings may be highly useful and extremely advantageous in conjunction with the operation of internal combustion engines having bearings of Babbitt or other corrosion-resistant bearing metals. The present invention in its broader aspects is therefore not limited to a particular compound having all or the greatest number of advantages, but embraces various of the less advantageous addition agents which will find utility in particular applications where all the possible improvement in properties may not be required or where the standard of performance may not be so high.

Present experience indicates that where the properties desired involve the ability to stabilize lubricating oils under severe operating conditions, such as those encountered in the lubrication of pistons and piston rings of internal combustion engines of the Diesel type, alkaline earth salts of sulfur-containing substituted acids of pentavalent phosphorus containing a high molecular weight alkyl or alkaryl substituent should be utilized.

A moderately acid refined Western naphthenic base lubricating oil is the preferred oil stock for compounding the lubricants involved herein. In general, the compounding ingredients appear to function more efficiently in such a base oil than in a highly paraffinic oil stock or a highly refined Western oil. However, it is to be understood that the invention is not limited to such a base stock since various of the present compounds, particularly the calcium salts, are more effective in inhibiting oxidation and corrosion effects in paraffinic oil stocks than are any compounds so far tested.

The proportion of the alkaline earth metal salts of substituted acids of phosphorus added to mineral lubricating oils may vary widely depending on the uses involved and the properties desired. As little as 0.05% by weight of the compound gives measurable improvements, particularly as respects inhibiting oxidation and color stability of the compounded oil. From approximately 0.25 to approximately 2% of the compound may be added to lubricants where increased stability in internal combustion engines and resistance to piston ring sticking comprise the principal properties desired. Solutions containing more than 2% of the compounds in mineral oil may be utilized for the purpose of preparing lubricating greases and concentrates capable of dilution with lubricating oils and the like. Such higher concentrations comprise a convenient method of handling the compounds and may be used as addition agents for lubricants in general as well as for other purposes.

The alkaline earth metal salts of this invention may be added to hydrocarbon oils containing other compounding ingredients such as pour point depressors, oiliness agents, extreme pressure addition agents, blooming agents, compounds for enhancing the viscosity index of the hydrocarbon oil, corrosion inhibitors and the like. The invention in its broader aspects embraces mineral hydrocarbon oils containing, in addition to metal salts of the substituted acids of phosphorus, thickening agents and/or metal soaps in proportions or in amounts insufficient to form greases, as in the case of mineral castor machine oils or other compounded liquid lubricants.

The compounds of this invention may be added to oils other than hydrocarbon lubricating oils, for example, fuel oils, non-drying vegetable or animal oils, or synthetic oils, such as olefin polymers and hydrogenated olefin polymers.

While the character of the invention has been described in detail and numerous examples of the composition given, this has been done by way of illustration only and with the intention that no limitation should be imposed on the invention thereby. It will be apparent to those skilled in the art that numerous modifications and variations of the illustrative examples may be effected in the practice of the invention which is of the scope of the claims appended hereto.

We claim:

1. A hydrocarbon oil composition comprising a major proportion of hydrocarbon oil of lubricating viscosity and a small amount, sufficient substantially to stabilize the oil against deterioration by heat and oxidation, of an alkaline earth metal salt of a sulfur-containing acid of phosphorus, said acid of phosphorus containing at least one oil-solubilizing organic substituent, the number of carbon atoms contained in said acid of phosphorus being at least 24.

2. The composition of claim 1, wherein said acid of phosphorus is an acid of pentavalent phosphorus.

3. The composition of claim 1, wherein said acid of phosphorus is a thiophosphoric acid and contains two hydrocarbon substituents each containing at least 12 carbon atoms.

4. A liquid petroleum lubricant containing about one quarter to two per cent by weight of an alkaline earth metal salt of an acid ester produced by a reaction of the type:

$$2ROH+P_2S_5 \rightarrow R_2PO_2S_2H+H_2S$$

wherein ROH is an hydroxy compound selected from the group consisting of alcoholic hydroxy compounds and phenolic hydroxy compounds, said salt having at least 24 carbon atoms per molecule.

5. A liquid petroleum lubricant containing about one quarter to two per cent by weight of an alkaline earth metal salt of an acid ester produced by a reaction of the type:

$$2ROH+P_2S_5 \rightarrow R_2PO_2S_2H+H_2S$$

wherein ROH is an hydroxy compound selected from the group consisting of alcohols and alkyl phenols, said salt having at least 24 carbon atoms per molecule.

6. The lubricant of claim 4, wherein the alkaline earth metal is calcium.

7. The lubricant of claim 4, wherein the alkaline earth metal is barium.

8. The lubricant of claim 4, wherein the alkaline earth metal is magnesium.

9. The lubricant of claim 4, wherein said hydroxy compound is an alcohol.

10. The lubricant of claim 5, wherein said hydroxy compound is a phenol.

11. The lubricant of claim 5, wherein said hydroxy compound is an alcohol.

12. The lubricant of claim 5, wherein said hydroxy compound is an alkyl phenol.

13. A liquid petroleum lubricant composition containing a major portion of liquid petroleum lubricant and about one quarter to two per cent by weight of an alkaline earth metal salt of an acid ester produced by a reaction of the type:

$$2ROH+P_2S_5 \rightarrow R_2PO_2S_2H+H_2S$$

wherein ROH is an hydroxy compound selected from the group consisting of alcohols and phenols, said salt having at least 24 carbon atoms per molecule.

14. The lubricant of claim 13, wherein said hydroxy compound is an alcohol.

15. The lubricant of claim 13, wherein said hydroxy compound is a phenol.

16. The lubricant of claim 13, wherein said hydroxy compound is an alkyl phenol.

17. The lubricant of claim 13, wherein said hydroxy compound is cetyl alcohol.

18. The lubricant of claim 13, wherein said hydroxy compound is cetylphenol.

19. A hydrocarbon oil composition comprising a major proportion of hydrocarbon oil of lubricating viscosity and a small amount, sufficient substantially to stabilize the oil against deterioration by heat and oxidation, of an alkaline earth metal salt of an acid ester produced by a reaction of the type:

$$2ROH+P_2S_5 \rightarrow R_2PO_2S_2H+H_2S$$

wherein ROH is an hydroxy compound containing not less than 12 alkyl carbon atoms and selected from the group consisting of aliphatic alcohols and alkyl substituted phenols, said salt having at least 24 carbon atoms per molecule.

JOHN T. RUTHERFORD.
ROBERT J. MILLER.